United States Patent
Yin (10) Patent No.: US 12,149,077 B1
(45) Date of Patent: Nov. 19, 2024

(54) BLOCKCHAIN-BASED NEW ENERGY POWER DATA TRANSMISSION METHOD FOR PHOTOVOLTAIC MODULE

(71) Applicant: CHONGQING QIANXIN NEW ENERGY CO., LTD., Chongqing (CN)

(72) Inventor: Chen Yin, Chongqing (CN)

(73) Assignee: CHONGQING QIANXIN NEW ENERGY CO., LTD., Chongqing (CN)

( * ) Notice: Subject to any disclaimer, the term of this patent is extended or adjusted under 35 U.S.C. 154(b) by 0 days.

(21) Appl. No.: 18/760,145

(22) Filed: Jul. 1, 2024

Related U.S. Application Data (63) Continuation of application No. PCT/CN2023/140922, filed on Dec. 22, 2023.

(30) Foreign Application Priority Data

Sep. 11, 2023 (CN) .......................... 202311166030.5

(51) Int. Cl.
*H02J 3/00* (2006.01)
*G06Q 50/06* (2024.01)
(Continued)

(52) U.S. Cl.
CPC ............. *H02J 3/008* (2013.01); *G06Q 50/06* (2013.01); *H02J 3/381* (2013.01); *H04L 9/50* (2022.05);
(Continued)

(58) Field of Classification Search
CPC ........ H02J 3/008; H02J 3/381; H02J 2203/10; H02J 2300/24; G06Q 50/06; H04L 9/50
See application file for complete search history.

(56) References Cited

U.S. PATENT DOCUMENTS 10,811,771 B1 * 10/2020 Tran .................. H04W 4/40
11,321,282 B2 * 5/2022 Tran .................. H04B 7/0413
(Continued)

FOREIGN PATENT DOCUMENTS

CN 106372749 A 2/2017
CN 107168049 A 9/2017
(Continued)

OTHER PUBLICATIONS

Notification to Grant Patent Right for Invention, Chinese Application No. 202311166030.5 mailed Mar. 5, 2024 (3 pages).
(Continued)

*Primary Examiner* — Ziaul Karim
(74) *Attorney, Agent, or Firm* — Daniel M. Cohn; Howard M. Cohn (57) ABSTRACT

A blockchain-based new energy power data transmission method for a photovoltaic module, comprising the following steps: S1, acquiring photovoltaic new energy power data; S2, converting the photovoltaic new energy power data acquired in S1 into photovoltaic new energy power image data; S3, processing the photovoltaic new energy power image data to obtain processed photovoltaic new energy power image data; and S4, transmitting the processed photovoltaic new energy power image data to a photovoltaic new energy power management platform. The invention can guarantee the security of acquired photovoltaic new energy power data and prevent the data from being tampered.

6 Claims, 1 Drawing Sheet

(51) Int. Cl.
  *H02J 3/38* (2006.01)
  *H04L 9/00* (2022.01)
(52) U.S. Cl.
  CPC ....... *H02J 2203/10* (2020.01); *H02J 2300/24* (2020.01)

(56) References Cited

U.S. PATENT DOCUMENTS

| | | | |
|---|---|---|---|
| 2019/0285672 A1* | 9/2019 | Hoff | H02S 50/15 |
| 2020/0359550 A1* | 11/2020 | Tran | A01G 25/167 |
| 2022/0077820 A1* | 3/2022 | Jeong | G06T 5/80 |
| 2022/0197306 A1* | 6/2022 | Cella | G06N 3/088 |
| 2022/0286845 A1* | 9/2022 | Vanoss | H04L 63/0876 |
| 2023/0339108 A1* | 10/2023 | Cella | B33Y 50/00 |

FOREIGN PATENT DOCUMENTS

| | | |
|---|---|---|
| CN | 107742171 A | 2/2018 |
| CN | 107168049 B | 11/2019 |
| CN | 110518881 A | 11/2019 |
| CN | 110717592 A | 1/2020 |
| CN | 107742171 B | 8/2020 |
| CN | 112465738 A | 3/2021 |
| CN | 113245923 A | 8/2021 |
| CN | 113448249 A | 9/2021 |
| CN | 114362354 A | 4/2022 |
| CN | 112465738 B | 5/2023 |
| CN | 116128170 A | 5/2023 |
| CN | 116128170 B | 6/2023 |
| CN | 112507793 B | 8/2023 |
| CN | 116523145 A | 8/2023 |
| CN | 114362354 B | 11/2023 |
| CN | 117195320 A | 12/2023 |
| CN | 117200971 A | 12/2023 |
| CN | 113077341 B | 4/2024 |
| JP | 2021180605 A | 11/2021 |
| WO | 2015054638 A1 | 4/2015 |

OTHER PUBLICATIONS

CNIPA, Office Action issued for Chinese Application No. 202311166030.5, mailed Feb. 23, 2024 (8 pages).

Zuan Fu et al., "Photovoltaic Power Prediction Based on Gray-scale Satellite Cloud Image and Optimized LSTM", The 6th IEEE Conference on Energy Internet and Energy System Integration, Full Text, 2023.

Chen, Mingshu, "The Design of Infrared Unmanned Aerial Vehicle System for Intelligent Inspection of Photovoltaic Plant", Instrumentation, 2017, vol. 24, (Issue 03), Full Text.

Wang, Deng et al., "Research progress on photovoltaic power generation system prediction", 2018, (Issue 07), Full Text.

Liu, Fu-cai et al., "The design of an ARM-based monitoring-control system for a photovoltaic plant", 2008, (Issue 04), Full Text.

Cao, Xiao et al., "Design of PV Power Forecasting System Based on Groud-Based Cloud Image Analysis", 2013, (Issue 03), Full Text.

\* cited by examiner

BLOCKCHAIN-BASED NEW ENERGY POWER DATA TRANSMISSION METHOD FOR PHOTOVOLTAIC MODULE

BACKGROUND OF THE INVENTION

1. Technical Field

The invention relates to the technical field of power data, in particular to a blockchain-based new energy power data transmission method for a photovoltaic module.

2. Description of Related Art

Photovoltaic power generation is a technique for directly converting light energy into electric energy by means of the photovoltaic effect of a semiconductor interface. A photovoltaic power generation device mainly comprises a solar cell panel (module), a controller and an inverter and uses electronic components as main components. Solar cells are connected in series and then packaged to be protected to form a large-area solar cell module, which works together with a power controller and other components to form the photovoltaic power generation device. To satisfy the grid connection requirement of photovoltaic power, photovoltaic power information needs to be monitored and acquired in real time to guarantee the stability of a photovoltaic power generation system. Real-time photovoltaic power monitoring data includes: meteorological parameters of the operating environment of the system, mainly including temperature, solar radiation intensity (solar irradiance), wind velocity and disastrous weather prediction; operating voltage and current of the solar cell panel. All the information is acquired, processed, transmitted and stored by a power station monitoring system via a communication channel to realize intelligent monitoring of a whole power station. Patent application No. 2021114072397 discloses a photovoltaic power data acquisition device for power load prediction, comprising an acquisition device body, wherein a plurality of heat-dissipation holes are formed in side faces of the acquisition device body, and dust screens are also mounted on the side faces of the acquisition device body and exactly face the plurality of heat-dissipation holes. This patent replaces a heat-dissipation mechanism of traditional acquisition devices and can prevent electronic components in the acquisition device from operating in a high-temperature environment for a long time, thus guaranteeing the operating stability of the acquisition device and facilitating photovoltaic power data acquisition; and the dust screens can be cleaned and dredged to be kept unblocked to ensure that air inside the acquisition device can smoothly pass through the dust screens to realize convection with air in the outside, thus guaranteeing the heat-dissipation performance of the acquisition device body. However, the invention fails to perform secure processing on acquired photovoltaic data, so potential security hazards of the data can be easily caused.

BRIEF SUMMARY OF THE INVENTION

The purpose of the invention is to particularly and innovatively provide a blockchain-based new energy power data transmission method for a photovoltaic module to solve at least the technical problems in the prior art.

To fulfill the above purpose, the invention provides a blockchain-based new energy power data transmission method for a photovoltaic module, comprising the following steps:

S1, acquiring photovoltaic new energy power data, wherein the photovoltaic new energy power data include one or any combination of corresponding voltages $V_1$-$V_K$, currents $i_1$-$i_K$, temperatures $T_1$-$T_K$ and solar irradiances $I_1$-$I_K$ within a time range $t_1$-$t_K$;

S2, converting the photovoltaic new energy power data acquired in S1 into photovoltaic new energy power image data, wherein the photovoltaic new energy power image data include one or any combination of a time-voltage curve graph, a time-current curve graph, a time-temperature curve graph and a time-solar irradiance curve graph;

S3, processing the photovoltaic new energy power image data to obtain processed photovoltaic new energy power image data; and S4, transmitting the processed photovoltaic new energy power image data to a photovoltaic new energy power management platform.

In a preferred embodiment of the invention, the blockchain-based new energy power data transmission method for a photovoltaic module further comprises a step S5: transmitting, by the photovoltaic new energy power management platform, the processed photovoltaic new energy power image data to a blockchain for storage.

In a preferred embodiment of the invention, in S2, the time-voltage curve graph, the time-current curve graph, the time-temperature curve graph and the time-solar irradiance curve graph are in four images respectively; the four images are a first image, a second image, a third image and a fourth image respectively; correspondingly, the time-voltage curve graph is in the first image, the time-current curve graph is in the second image, the time-temperature curve graph is in the third image, and the time-solar irradiance curve graph is in the fourth image;

any combinations of the time-voltage curve graph, the time-current curve graph, the time-temperature curve graph and the time-solar irradiance curve graph are in three images respectively; the three images are a first image, a second image and a third image respectively; correspondingly, the time-voltage curve graph and the time-current curve graph are in the first image, the time-temperature curve graph is in the second image, and the time-solar irradiance curve graph is in the third image; or, correspondingly, the time-voltage curve graph is in the first image, the time-current curve graph and the time-temperature curve graph are in the second image, and the time-solar irradiance curve graph is in the third image; or, correspondingly, the time-voltage curve graph is in the first image, the time-current curve graph is in the second image, and the time-temperature curve graph and the time-solar irradiance curve graph are in the third image; other forms will not be listed here;

any combinations of the time-voltage curve graph, the time-current curve graph, the time-temperature curve graph and the time-solar irradiance curve graph are in two images respectively; the two images are a first image and a second image respectively; correspondingly, the time-voltage curve graph is in the first image, and the time-current curve graph, the time-temperature curve graph and the time-solar irradiance curve graph are in the second image; or, correspondingly, the time-current curve graph is in the first image, and the time-voltage curve graph, the time-temperature curve graph and the time-solar irradiance curve graph are in the second image; or, correspondingly, the time-voltage curve graph and the time-current curve graph are in the first image, and the time-temperature curve graph and the time-solar irradiance curve graph are in the second image; other forms will not be listed here; or the time-voltage curve graph, the time-current curve graph, the time-temperature curve graph and the time-solar irradiance curve graph are in one image;

each image is a photovoltaic new energy power image.

In a preferred embodiment of the invention, in S3, a method for processing the photovoltaic new energy power image data to obtain processed photovoltaic new energy power image data comprises the following steps:

S31, determining whether the photovoltaic new energy power image is a gray image:

if the photovoltaic new energy power image is a gray image, taking the photovoltaic new energy power image as a photovoltaic new energy power gray image, and performing the next step; or if the photovoltaic new energy power image is a non-gray image, converting the photovoltaic new energy power image into a photovoltaic new energy power gray image, and performing the next step;

S32, obtaining, by calculation, an image value of the photovoltaic new energy power image or the photovoltaic new energy power gray image;

S33, generating a new photovoltaic new energy power image by means of the photovoltaic new energy power gray image and the image value; and S34, transmitting the new photovoltaic new energy power image to the photovoltaic new energy power management platform.

In a preferred embodiment of the invention, in S31, a method for converting the photovoltaic new energy power image into a photovoltaic new energy power gray image is:

$GRAYimge(x,y) = r(x,y) \times \eta_r + g(x,y) \times \eta_g + b(x,y) \times \eta_b$ where, $GRAYimge(x,y)$ denotes a gray value at coordinates $(x,y)$ of the photovoltaic new energy power image, $x=1, 2, 3, \ldots, X$, $y=1, 2, 3, \ldots, Y$, $X$ denotes the number of horizontal pixels of the photovoltaic new energy power image, and $Y$ denotes the number of vertical pixels of the photovoltaic new energy power image;

$r(x,y)$ denotes a red value at the coordinates $(x,y)$ of the photovoltaic new energy power image;

$g(x,y)$ denotes a green value at the coordinates $(x,y)$ of the photovoltaic new energy power image;

$b(x,y)$ denotes a blue value at the coordinates $(x,y)$ of the photovoltaic new energy power image;

$\eta_r$ denotes a coefficient of the red value; $\eta_r + \eta_g + \eta_b = 1$, $\eta_r \in [0,1]$;

$\eta_g$ denotes a coefficient of the green value; $\eta_g \in [0,1]$;

$\eta_b$ denotes a coefficient of the blue value; $\eta_b \in [0,1]$.

In a preferred embodiment of the invention, in S32, a method for obtaining, by calculation, an image value of the photovoltaic new energy power image is:

Imagecode=Imagecodeoperationmethod (newenergypowerimage)

where, Imagecode denotes the image value of the photovoltaic new energy power image obtained by calculation;

Imagecodeoperationmethod (denotes a photovoltaic new energy power image calculation method, which is preferably an SHA1 digest algorithm;

newenergypowerimage denotes the photovoltaic new energy power image;

in S32, a method for obtaining, by calculation, an image value of the photovoltaic new energy power gray image is:

Imagecode=Grayimagecodeoperationmethod (newenergypowergrayimage), where, Imagecode denotes the image value of the photovoltaic new energy power gray image obtained by calculation;

Grayimagecodeoperationmethod (denotes a photovoltaic new energy power gray image calculation method, which is preferably an SHA1 digest algorithm;

newenergypowergrayimage denotes the photovoltaic new energy power gray image.

In a preferred embodiment of the invention, in S33, a method for generating a new photovoltaic new energy power image by means of the photovoltaic new energy power gray image and the image value comprises the following steps:

S331, acquiring the number of bits of the photovoltaic new energy power gray image;

S332, obtaining the number of bits of the image value according to the number of bits of the photovoltaic new energy power gray image acquired in S331 and the image value obtained in S32;

S333, combining gray values in the photovoltaic new energy power gray image and the image value to obtain new gray values; and S334, obtaining the new photovoltaic new energy power image according to the new gray values.

In a preferred embodiment of the invention, in S332, a method for obtaining the number of bits of the image value according to the number of bits of the photovoltaic new energy power gray image acquired in S331 and the image value obtained in S32 comprises the following steps:

S321, converting the image value obtained in S32 into a binary image value which is denoted by $IMAGE_2$, wherein $IMAGE_2$ denotes the binary image value; and S322, determining a relationship between $\|IMAGE_2\|$ and $\|GRAYimge\|$ if $\|IMAGE_2\| = \|GRAYimge\|$, performing no operation on the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits;

if $\|IMAGE_2\| > \|GRAYimge\|$, keeping first $\|GRAYimge\|$ bits of the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits; or if $\|IMAGE_2\| < \|GRAYimge\|$, adding $\|IMAGE_2\|-\|GRAYimge\|$ 0 or 1 in front of or behind the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits.

In a preferred embodiment of the invention, in S333, a method for combining gray values in the photovoltaic new energy power gray image and the image value to obtain new gray values is:

$$GRAYimge_2'(x,y) = GRAYimge_2(x,y) \oplus IMAGE_2,$$

where, $GRAYimge_2'(x,y)$ denotes the new gray values;

$GRAYimge_2(x,y)$ denotes a binary value of the gray value at the coordinates $(x,y)$ of the photovoltaic new energy power image, $x=1, 2, 3, \ldots, X$, $y=1, 2, 3, \ldots, Y$, $X$ denotes the number of horizontal pixels of the photovoltaic new energy power image, and $Y$ denotes the number of vertical pixels of the photovoltaic new energy power image;

⊕ denotes a binary operator, which is preferably XNOR or XOR;

IMAGE$_2$ denotes the binary image value.

In a preferred embodiment of the invention, S334 comprises the following steps:

S3341, forming the new photovoltaic new energy power image by all the new gray values; and S3342, taking the image value as a name of the new photovoltaic new energy power image.

In a preferred embodiment of the invention, the blockchain-based new energy power data transmission method for a photovoltaic module further comprises in S5: after the photovoltaic new energy power management platform receives the new photovoltaic new energy power image, obtaining a photovoltaic new energy power platform image by means of the new photovoltaic new energy power image; and obtaining photovoltaic new energy power data according to the photovoltaic new energy power platform image.

In a preferred embodiment of the invention, in S5, a method for obtaining a photovoltaic new energy power platform image by means of the new photovoltaic new energy power image comprises the following steps:

S51, acquiring the name of the new photovoltaic new energy power image; and

S52, generating the photovoltaic new energy power platform image by means of the new photovoltaic new energy power image and the name of the new photovoltaic new energy power image.

In a preferred embodiment of the invention, in S52, a method for generating the photovoltaic new energy power platform image by means of the new photovoltaic new energy power image and the name of the new photovoltaic new energy power image comprises the following steps:

S521, acquiring the number of bits of the new photovoltaic new energy power image;

S522, obtaining the number of bits of a new platform image value according to the number of bits of the new photovoltaic new energy power image acquired in S521 and the name, which is a platform image value, acquired in S51;

S523, combining gray values in the new photovoltaic new energy power image and the new platform image value to obtain new platform gray values; and S524, obtaining the photovoltaic new energy power platform image according to the new platform gray values.

In a preferred embodiment of the invention, in S522, a method for obtaining the number of bits of a new platform image value according to the number of bits of the new photovoltaic new energy power image acquired in S521 and the name, which is a platform image value, acquired in S51 comprises the following steps:

S5221, converting the platform image value in S522 into a binary platform image value which is denoted by IMAGE'$_2$, wherein IMAGE'$_2$ denotes the binary platform image value; and S5322, determining a relationship between ∥IMAGE'$_2$∥ and ∥GRAYimge"∥;

if ∥IMAGE'$_2$∥=∥GRAYimge"∥ performing no operation on the binary platform image value, wherein ∥IMAGE'$_2$∥ denotes the number of bits of the binary platform image value, ∥GRAYimge"∥ denotes the number of bits of the new photovoltaic new energy power image received by the photovoltaic new energy power management platform, and ∥ ∥ denotes calculation of the number of bits;

if ∥IMAGE'$_2$∥>∥GRAYimge"∥, keeping first ∥GRAYimge∥ bit of the binary platform image value, wherein ∥IMAGE'$_2$∥ denotes the number of bits of the binary platform image value, ∥GRAYimge"∥ denotes the number of bits of the new photovoltaic new energy power image received by the photovoltaic new energy power management platform, and ∥ ∥ denotes calculation of the number of bits; or if ∥IMAGE'$_2$∥<∥GRAYimge"∥, adding ∥GRAYimge"$_2$∥−∥GRAYimge"∥ 0 or 1 in front of or behind the binary platform image value, wherein ∥IMAGE'$_2$∥ denotes the number of bits of the binary platform image value, ∥GRAYimge"∥ denotes the number of bits of the new photovoltaic new energy power image received by the photovoltaic new energy power management platform, and ∥ ∥ denotes calculation of the number of bits.

In a preferred embodiment of the invention, in S523, the gray values in the new photovoltaic new energy power image and the new platform image value are combined to obtain the new platform gray values:

GRAYimge'''$_2$(x,y)=GRAYimge"$_2$(x,y)⊕IMAGE'$_2$, where, GRAYimge'''$_2$(x,y) denotes the new platform gray values;

GRAYimge"$_2$(x,y) denotes a binary value of the gray value at coordinates (x,y) of the new photovoltaic new energy power image received by the photovoltaic new energy power management platform, x=1, 2, 3, . . . , X, y=1, 2, 3, . . . , Y, X denotes the number of horizontal pixels of the new photovoltaic new energy power image, and Y denotes the number of vertical pixels of the new photovoltaic new energy power image;

⊕ denotes a binary operator, which is preferably XNOR or XOR;

IMAGE'$_2$ denotes the binary platform image value;

the photovoltaic new energy power platform image is formed by all the new platform gray values.

To sum up, by adopting the above technical solution, the invention can guarantee the security of acquired photovoltaic new energy power data and prevent the data from being tampered.

Other aspects and advantages of the invention will be partially provided in the following description, and partially become obvious in the following description or be understood in practice of the invention.

BRIEF DESCRIPTION OF THE SEVERAL VIEWS OF THE DRAWINGS

The above and/or other aspects and advantages of the invention will become obvious and be easily understood in the following description of embodiments with reference to the accompanying drawing, wherein.

DETAILED DESCRIPTION OF THE INVENTION

Figure 1:
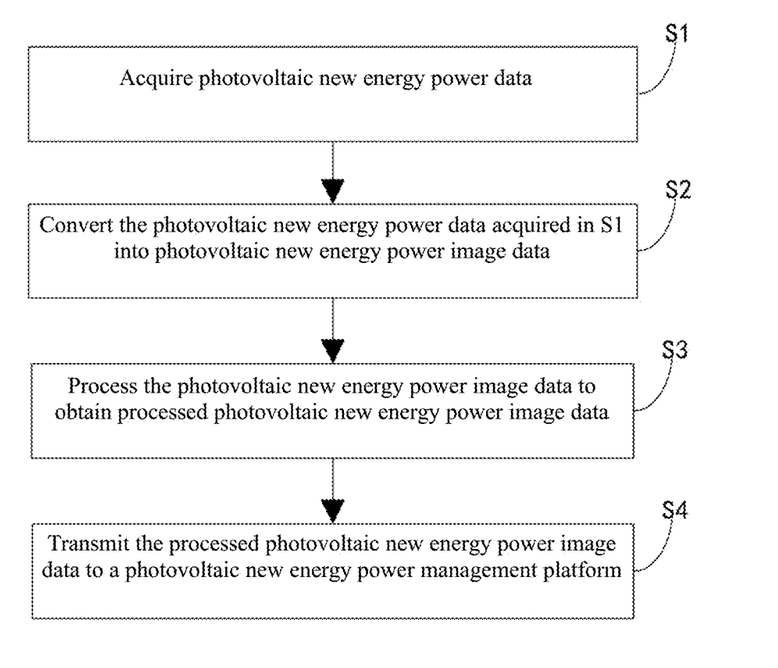
FIG. 1 is a schematic flow block diagram of the invention.

The embodiments of the invention will be described in detail below, and an example of the embodiments is illustrated in the accompanying drawing, in which identical or similar reference signs indicate identical or similar elements or elements with identical or similar functions. The embodiments described below with reference to the accompanying drawing are illustrative ones which are only used for explaining the invention, and thus should not be construed as limitations of the invention.

The invention provides blockchain-based new energy power data transmission method for a photovoltaic module, comprising the following steps:

S1, acquiring photovoltaic new energy power data, wherein the photovoltaic new energy power data include one or any combination of corresponding voltages $V_K$, currents $i_1$-$i_K$, temperatures $T_1$-$T_K$ and solar irradiances $I_1$-$I_K$ within a time range $t_1$-$t_K$, and relationships between the time range $t_1$-$t_K$ and the corresponding voltages $V_1$-$V_K$, currents $i_1$-$i_K$, temperatures $T_1$-$T_K$ and solar irradiances $I_1$-$I_K$ within are shown in Table 1;

TABLE 1

The relationships between time and voltage, current, temperature and solar irradiance

| Time | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | ...... | $t_K$ |
|---|---|---|---|---|---|---|---|---|---|---|---|---|---|---|
| Voltage | $V_1$ | $V_2$ | $V_3$ | $V_4$ | $V_5$ | $V_6$ | $V_7$ | $V_8$ | $V_9$ | $V_{10}$ | $V_{11}$ | $V_{12}$ | ...... | $V_K$ |
| Current | $i_1$ | $i_2$ | $i_3$ | $i_4$ | $i_5$ | $i_6$ | $i_7$ | $i_8$ | $i_9$ | $i_{10}$ | $i_{11}$ | $i_{12}$ | ...... | $i_K$ |
| Temperature | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | ...... | $T_K$ |
| Solar irradiance | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ | ...... | $I_K$ |

Where, $t_1$ denotes a first time, $t_2$ denotes a second time, $t_3$ denotes a third time, $t_4$ denotes a fourth time, $t_5$ denotes a fifth time, $t_6$ denotes a sixth time, $t_7$ denotes a seventh time, $t_8$ denotes an eighth time, $t_9$ denotes a ninth time, $t_{10}$ denotes a tenth time, $t_{11}$ denotes an eleventh time, $t_{12}$ denotes a twelfth time, and $t_K$ denotes a $K^{th}$ time;

$V_1$ denotes the voltage at the time $t_1$, $V_2$ denotes the voltage at the time $t_2$, $V_3$ denotes the voltage at the time $t_3$, $V_4$ denotes the voltage at the time $t_4$, $V_5$ denotes the voltage at the time $t_5$, $V_6$ denotes the voltage at the time $t_6$, $V_7$ denotes the voltage at the time $t_7$, $V_8$ denotes the voltage at the time $t_8$, $V_9$ denotes the voltage at the time $t_9$, $V_{10}$ denotes the voltage at the time $t_{10}$ $V_{11}$ denotes the voltage at the time $t_{11}$, $V_{12}$ denotes the voltage at the time $t_{12}$, and $V_K$ denotes the voltage at the time $t_K$;

$i_1$ denotes the current at the time $t_1$, $i_2$ denotes the current at the time $t_2$, $t_2$, $V_3$ denotes the current at the time $t_3$, $V_4$ denotes the current at the time $t_4$, $i_5$ denotes the current at the time $t_5$, $i_6$ denotes the current at the time $t_6$, $i_7$ denotes the current at the time $t_7$, $i_8$ denotes the current at the time $t_8$, $i_9$ denotes the current at the time $t_9$, $i_{10}$ denotes the current at the time $t_{10}$, $i_{11}$ denotes the current at the time $t_{11}$, $i_{12}$ denotes the current at the time $t_{12}$, and $i_K$ denotes the current at the time $t_K$.

$T_1$ denotes the temperature at the time $t_1$, $T_2$ denotes the temperature at the time $t_2$, $T_3$ denotes the temperature at the time $t_3$, $T_4$ denotes the temperature at the time $t_4$, $T_5$ denotes the temperature at the time $t_5$, $T_6$ denotes the temperature at the time $t_6$, $T_7$ denotes the temperature at the time $t_7$, $T_8$ denotes the temperature at the time $t_8$, $T_9$ denotes the temperature at the time $t_9$, $T_{10}$ denotes the temperature at the time $t_{10}$, $T_{11}$ denotes the temperature at the time $t_{11}$, $T_{12}$ denotes the temperature at the time $t_{12}$, and $T_K$ denotes the temperature at the time $t_K$;

$I_1$ denotes the solar irradiance at the time $t_1$, $I_2$ denotes the solar irradiance at the time $t_2$, $I_3$ denotes the solar irradiance at the time $t_3$, $I_4$ denotes the solar irradiance at the time $t_4$, $I_5$ denotes the solar irradiance at the time $t_5$, $I_6$ denotes the solar irradiance at the time $t_6$, $I_7$ denotes the solar irradiance at the time $t_7$, $I_8$ denotes the solar irradiance at the time $t_8$, $I_9$ denotes the solar irradiance at the time $t_9$, $I_0$ denotes the solar irradiance at the time $t_{10}$, $I_{11}$ denotes the solar irradiance at the time $t_{11}$, $I_{12}$ denotes the solar irradiance at the time $t_{12}$, and $I_K$ denotes the solar irradiance at the time $t_K$;

S2, converting the photovoltaic new energy power data acquired in S1 into photovoltaic new energy power image data, wherein the photovoltaic new energy power image data include one or any combination of a time-voltage curve graph, a time-current curve graph, a time-temperature curve graph and a time-solar irradiance curve graph;

S3, processing the photovoltaic new energy power image data to obtain processed photovoltaic new energy power image data; and S4, transmitting the processed photovoltaic new energy power image data to a photovoltaic new energy power management platform.

In a preferred embodiment of the invention, the blockchain-based new energy power data transmission method for photovoltaic modules further comprises a step S5: transmitting, by the photovoltaic new energy power management platform, the processed photovoltaic new energy power image data to a blockchain for storage.

In a preferred embodiment of the invention, in S2, the time-voltage curve graph, the time-current curve graph, the time-temperature curve graph and the time-solar irradiance curve graph are in four images respectively; the four images are a first image, a second image, a third image and a fourth image respectively; correspondingly, the time-voltage curve graph is in the first image, the time-current curve graph is in the second image, the time-temperature curve graph is in the third image, and the time-solar irradiance curve graph is in the fourth image;

any combinations of the time-voltage curve graph, the time-current curve graph, the time-temperature curve graph and the time-solar irradiance curve graph are in three images respectively; the three images are a first image, a second image and a third image respectively; correspondingly, the time-voltage curve graph and the time-current curve graph are in the first image, the time-temperature curve graph is in the second image, and the time-solar irradiance curve graph is in the third image; or, correspondingly, the time-voltage curve graph is in the first image, the time-current curve graph and the time-temperature curve graph are in the second image, and the time-solar irradiance curve graph is in the third image; or, correspondingly, the time-voltage curve graph is in the first image, the time-current curve graph is in the second image, and the time-temperature curve graph and the time-solar irradiance curve graph are in the third image; other forms will not be listed here;

any combinations of the time-voltage curve graph, the time-current curve graph, the time-temperature curve graph and the time-solar irradiance curve graph are in two images respectively; the two images are a first image and a second image respectively; correspondingly, the time-voltage curve graph is in the first image, and the time-current curve graph, the time-temperature curve graph and the time-solar irradiance curve graph are in the second image; or, correspondingly, the time-current curve graph is in the first image, and the time-voltage curve graph, the time-temperature curve graph and the time-solar irradiance curve graph are in the second image; or, correspondingly, the time-voltage curve graph and the time-current curve graph are in the first image, and the time-temperature curve graph and the time-solar irradiance curve graph are in the second image; other forms will not be listed here; or the time-voltage curve graph, the time-current curve graph, the time-temperature curve graph and the time-solar irradiance curve graph are in one image; each image is a photovoltaic new energy power image.

In a preferred embodiment of the invention, in S3, a method for processing the photovoltaic new energy power image data to obtain processed photovoltaic new energy power image data comprises the following steps:

S31, determining whether the photovoltaic new energy power image is a gray image:

if the photovoltaic new energy power image is a gray image, taking the photovoltaic new energy power image as a photovoltaic new energy power gray image, and performing the next step; or if the photovoltaic new energy power image is a non-gray image, converting the photovoltaic new energy power image into a photovoltaic new energy power gray image, and performing the next step;

S32, obtaining, by calculation, an image value of the photovoltaic new energy power image or the photovoltaic new energy power gray image;

S33, generating a new photovoltaic new energy power image by means of the photovoltaic new energy power gray image and the image value; and S34, transmitting the new photovoltaic new energy power image to the photovoltaic new energy power management platform.

In a preferred embodiment of the invention, in S31, a method for converting the photovoltaic new energy power image into a photovoltaic new energy power gray image is:

$GRAYimge(x,y)=r(x,y)\times\eta_r+g(x,y)\times\eta_g+b(x,y)\times\eta_b$, where, $GRAYimge(x,y)$ denotes a gray value at coordinates (x,y) of the photovoltaic new energy power image, x=1, 2, 3, . . . , X, y=1, 2, 3, . . . , Y, X denotes the number of horizontal pixels of the photovoltaic new energy power image, and Y denotes the number of vertical pixels of the photovoltaic new energy power image;

r(x,y) denotes a red value at the coordinates (x,y) of the photovoltaic new energy power image;

g(x,y) denotes a green value at the coordinates (x,y) of the photovoltaic new energy power image;

b(x,y) denotes a blue value at the coordinates (x,y) of the photovoltaic new energy power image;

$\eta_r$ denotes a coefficient of the red value; $\eta_r+\eta_g+\eta_b=1$, $\eta_r\in[0,1]$;

$\eta_g$ denotes a coefficient of the green value; $\eta_g\in[0,1]$;

$\eta_b$ denotes a coefficient of the blue value; $\eta_b\in[0,1]$.

In a preferred embodiment of the invention, in S32, a method for obtaining, by calculation, an image value of the photovoltaic new energy power image is:

Imagecode=Imagecodeoperationmethod (newenergypowerimage), where, Imagecode denotes the image value of the photovoltaic new energy power image obtained by calculation;

Imagecodeoperationmethod( ) denotes a photovoltaic new energy power image (image value) calculation method, which is preferably an SHA1 digest algorithm; an SHA1 digest algorithm is preferred;

newenergypowerimage denotes the photovoltaic new energy power image;

in S32, a method for obtaining, by calculation, an image value of the photovoltaic new energy power gray image is:

Imagecode=Grayimagecodeoperationmethod (newenergypowergrayimage), where, Imagecode denotes the image value of the photovoltaic new energy power gray image obtained by calculation;

Grayimagecodeoperationmethod( ) denotes a photovoltaic new energy power gray image (image value) calculation method, which is preferably an SHA1 digest algorithm;

newenergypowergrayimage denotes the photovoltaic new energy power gray image.

In a preferred embodiment of the invention, in S33, a method for generating a new photovoltaic new energy power image by means of the photovoltaic new energy power gray image and the image value comprises the following steps:

S331, acquiring the number of bits of the photovoltaic new energy power gray image;

S332, obtaining the number of bits of the image value according to the number of bits of the photovoltaic new energy power gray image acquired in S331 and the image value obtained in S32;

S333, combining gray values in the photovoltaic new energy power gray image and the image value to obtain new gray values; and S334, obtaining the new photovoltaic new energy power image according to the new gray values.

In a preferred embodiment of the invention, in S332, a method for obtaining the number of bits of the image value according to the number of bits of the photovoltaic new energy power gray image acquired in S331 and the image value obtained in S32 comprises the following steps:

S321, converting the image value obtained in S32 into a binary image value which is denoted by $IMAGE_2$, wherein $IMAGE_2$ denotes the binary image value; and S322, determining a relationship between $\|IMAGE_2\|$ and $\|GRAYimge\|$:

if $\|IMAGE_2\|=\|GRAYimge\|$, performing no operation on the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits;

if $\|IMAGE_2\|<\|GRAYimge\|$, keeping first $\|GRAYimge\|$ bits of the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits; or if $\|IMAGE_2\|<\|GRAYimge\|$, adding $\|IMAGE_2\|-\|GRAYimge\|$ 0 or 1 in front of or behind the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits.

In a preferred embodiment of the invention, in S333, a method for combining gray values in the photovoltaic new energy power gray image and the image value to obtain new gray values is:

$GRAYimge'_2(x,y) = GRAYimge_2(x,y) \oplus IMAGE_2$, where, $GRAYimge'_2(x,y)$ denotes the new gray values;

$GRAYimge_2(x,y)$ denotes a binary value of the gray value at the coordinates (x,y) of the photovoltaic new energy power image, x=1, 2, 3, . . . , X, y=1, 2, 3, . . . , Y, X denotes the number of horizontal pixels of the photovoltaic new energy power image, and Y denotes the number of vertical pixels of the photovoltaic new energy power image;

$\oplus$ denotes a binary operator, which is preferably XNOR or XOR;

$IMAGE_2$ denotes the binary image value.

In a preferred embodiment of the invention, S334 comprises the following steps:

S3341, forming the new photovoltaic new energy power image by all the new gray values; and S3342, taking the image value as a name of the new photovoltaic new energy power image.

In a preferred embodiment of the invention, the blockchain-based new energy power data transmission method for photovoltaic modules further comprises in S5: after the photovoltaic new energy power management platform receives the new photovoltaic new energy power image, obtaining a photovoltaic new energy power platform image by means of the new photovoltaic new energy power image; and obtaining photovoltaic new energy power data according to the photovoltaic new energy power platform image.

In a preferred embodiment of the invention, in S5, a method for obtaining a photovoltaic new energy power platform image by means of the new photovoltaic new energy power image comprises the following steps:

S51, acquiring the name of the new photovoltaic new energy power image; and

S52, generating the photovoltaic new energy power platform image by means of the new photovoltaic new energy power image and the name of the new photovoltaic new energy power image.

In a preferred embodiment of the invention, in S52, a method for generating the photovoltaic new energy power platform image by means of the new photovoltaic new energy power image and the name of the new photovoltaic new energy power image comprises the following steps:

S521, acquiring the number of bits of the new photovoltaic new energy power image;

S522, obtaining the number of bits of a new platform image value according to the number of bits of the new photovoltaic new energy power image acquired in S521 and the name, which is a platform image value, acquired in S51;

S523, combining gray values in the new photovoltaic new energy power image and the new platform image value to obtain new platform gray values; and S524, obtaining the photovoltaic new energy power platform image according to the new platform gray values, wherein in this step, to guarantee that the photovoltaic new energy power platform image is the photovoltaic new energy power gray image acquired in S31, tamper-proof validation is performed on the photovoltaic new energy power platform image by the following steps:

Step 1: obtaining, by calculation, an image validation value of the photovoltaic new energy power platform image by:

Imagevalidationcode=Imagevalidationcodeoperationmethod(newenergypowermanagementimage), where, Imagevalidationcode denotes the image validation value of the photovoltaic new energy power platform image obtained by calculation:

Imagevalidationcodeoperationmethod( ) denotes an image validation value calculation method, which is preferably an SHA1 digest algorithm;

newenergypowermanagementimage denotes the photovoltaic new energy power platform image; and Step 2, determining whether the image validation value is consistent with the platform image value (the name of the new photovoltaic new energy power image in S51):

if the image validation value is consistent with the platform image value, determining that the new photovoltaic new energy power platform image received by the photovoltaic new energy power management platform is not tampered; or if the image validation value is inconsistent with the platform image value, determining that the new photovoltaic new energy power platform image received by the photovoltaic new energy power management platform is tampered.

In a preferred embodiment of the invention, in S522, a method for obtaining the number of bits of a new platform image value according to the number of bits of the new photovoltaic new energy power image acquired in S521 and the name, which is a platform image value, acquired in S51 comprises the following steps:

S5221, converting the platform image value in S522 into a binary platform image value which is denoted by $IMAGE'_2$ wherein $IMAGE'_2$ denotes the binary platform image value; and S5322, determining a relationship between $\|IMAGE_2\|$ and $\|GRAYimge''\|$:

if $\|IMAGE'_2\| = \|GRAYimge''\|$, performing no operation on the binary platform image value, wherein $\|IMAGE_2\|$ denotes the number of bits of the binary platform image value, $\|GRAYimge''\|$ denotes the number of bits of the new photovoltaic new energy power image received by the photovoltaic new energy power management platform, and $\|\ \|$ denotes calculation of the number of bits;

if $\|IMAGE'_2\| < \|GRAYimge''\|$, keeping first $\|GRAYimge\|$ bit of the binary platform image value, wherein $\|IMAGE'_2\|$ denotes the number of bits of the binary platform image value, $\|GRAYimge''\|$ denotes the number of bits of the new photovoltaic new energy power image received by the photovoltaic new energy power management platform, and $\|\ \|$ denotes calculation of the number of bits; or if $\|IMAGE'_2\| < \|GRAYimge''\|$, adding $\|IMAGE'_2\| - \|GRAYimge''\|$ 0 or 1 in front of or behind the binary platform image value, wherein $\|IMAGE'_2\|$ denotes the number of bits of the binary platform image value, $\|GRAYimge''\|$ denotes the number of bits of the new photovoltaic new energy power image received by the photovoltaic new energy power management platform, and $\|\ \|$ denotes calculation of the number of bits.

In a preferred embodiment of the invention, in S523, the gray values in the new photovoltaic new energy power image and the new platform image value are combined to obtain the new platform gray values:

$GRAYimge'''_2(x,y) = GRAYimge''_2(x,y) \oplus IMAGE'_2$, where, $GRAYimge'''_2(x,y)$ denotes the new platform gray values;

$GRAYimge''_2(x,y)$ denotes a binary value of the gray value at coordinates (x,y) of the new photovoltaic new energy power image received by the photovoltaic new energy power management platform, x=1, 2, 3, ..., X, y=1, 2, 3, ..., Y, X denotes the number of horizontal pixels of the new photovoltaic new energy power image, and Y denotes the number of vertical pixels of the new photovoltaic new energy power image;

$\oplus$ denotes a binary operator, which is preferably XNOR or XOR;

$IMAGE'_2$ denotes the binary platform image value;

the photovoltaic new energy power platform image is formed by all the new platform gray values.

Although the embodiments of the invention have been illustrated and described, those ordinarily skilled in the art can understand that various transformations, amendments, substitutions and modifications can be made to these embodiments without departing from the principle and purpose of the invention, and the scope of the invention is defined by the claims and their equivalents.

What is claimed is:

1. A blockchain-based new energy power data transmission method for a photovoltaic module, comprising the following steps:

S1, acquiring photovoltaic new energy power data, wherein the photovoltaic new energy power data include one or any combination of corresponding voltages $V_1$-$V_K$, currents $i_1$-$i_K$, temperatures $T_1$-$T_K$ and solar irradiances $I_1$-$I_K$ within a time range $t_1$-$T_K$;

S2, converting the photovoltaic new energy power data acquired in S1 into photovoltaic new energy power image data, wherein the photovoltaic new energy power image data include one or any combination of a time-voltage curve graph, a time-current curve graph, a time-temperature curve graph and a time-solar irradiance curve graph;

S3, processing the photovoltaic new energy power image data to obtain processed photovoltaic new energy power image data, wherein in S3, a method for processing the photovoltaic new energy power image data to obtain processed photovoltaic new energy power image data comprises the following steps:

S31, determining whether a photovoltaic new energy power image is a gray image:

if the photovoltaic new energy power image is a gray image, taking the photovoltaic new energy power image as a photovoltaic new energy power gray image, and performing the next step; or if the photovoltaic new energy power image is a non-gray image, converting the photovoltaic new energy power image into a photovoltaic new energy power gray image, and performing the next step;

S32, obtaining, by calculation, an image value of the photovoltaic new energy power image or the photovoltaic new energy power gray image;

S33, generating a new photovoltaic new energy power image by means of the photovoltaic new energy power gray image and the image value; and S34, transmitting the new photovoltaic new energy power image to the photovoltaic new energy power management platform;

wherein, in S31, a method for converting the photovoltaic new energy power image into a photovoltaic new energy power gray image is:

$GRAYimge(x,y) = r(x,y) \times \eta_r + g(x,y) \times \eta_g + b(x,y) \times \eta_b$, where, $GRAYimge(x,y)$ denotes a gray value at coordinates (x,y) of the photovoltaic new energy power image, x=1, 2, 3, ..., X, y=1, 2, 3, ..., Y, X denotes the number of horizontal pixels of the photovoltaic new energy power image, and Y denotes the number of vertical pixels of the photovoltaic new energy power image;

$r(x,y)$ denotes a red value at the coordinates (x,y) of the photovoltaic new energy power image;

$g(x,y)$ denotes a green value at the coordinates (x,y) of the photovoltaic new energy power image;

$b(x,y)$ denotes a blue value at the coordinates (x,y) of the photovoltaic new energy power image;

$\eta^r$ denotes a coefficient of the red value; $\eta_r + \eta_g + \eta_b = 1$, $\eta_r \in [0,1]$;

$\eta_g$ denotes a coefficient of the green value; $\eta_g \in [0,1]$;

$\eta_b$ denotes a coefficient of the blue value; $\eta_b \in [0,1]$;

wherein, in S32, a method for obtaining, by calculation, an image value of the photovoltaic new energy power image is:

Imagecode=Imagecodeoperationmethod(newenergypowerimage), where, Imagecode denotes the image value of the photovoltaic new energy power image obtained by calculation;

Imagecodeoperationmethod (denotes a photovoltaic new energy power image calculation method;

newenergypowerimage denotes the photovoltaic new energy power image;

in S32, a method for obtaining, by calculation, an image value of the photovoltaic new energy power gray image is:

Imagecode=Grayimagecodeoperationmethod(newenergypowergrayimage), where, Imagecode denotes the image value of the photovoltaic new energy power gray image obtained by calculation;

Grayimagecodeoperationmethod (denotes a photovoltaic new energy power gray image calculation method;

newenergypowergrayimage denotes the photovoltaic new energy power gray image;

wherein, in S33, a method for generating a new photovoltaic new energy power image by means of the photovoltaic new energy power gray image and the image value comprises the following steps:

S331, acquiring the number of bits of the photovoltaic new energy power gray image;

S332, obtaining the number of bits of the image value according to the number of bits of the photovoltaic new energy power gray image acquired in S331 and the image value obtained in S32;

S333, combining gray values in the photovoltaic new energy power gray image and the image value to obtain new gray values; and S334, obtaining the new photovoltaic new energy power image according to the new gray values;

wherein, in S332, a method for obtaining the number of bits of the image value according to the number of bits of the photovoltaic new energy power gray image acquired in S331 and the image value obtained in S32 comprises the following steps:

S321, converting the image value obtained in S32 into a binary image value which is denoted by $IMAGE_2$, wherein $IMAGE_2$ denotes the binary image value; and S322, determining a relationship between $\|IMAGE_2\|$ and $\|GRAYimge\|$:

if $\|IMAGE_2\|=\|GRAYimge\|$, performing no operation on the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits;

if $\|IMAGE_2\|>\|GRAYimge\|$, keeping first $\|GRAYimge\|$ bits of the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits; or if $\|IMAGE_2\|<\|GRAYimge\|$, adding $\|IMAGE_2\|-\|GRAYimge\|$ 0 or 1 in front of or behind the binary image value, wherein $\|IMAGE_2\|$ denotes the number of bits of the binary image value, $\|GRAYimge\|$ denotes the number of bits of the photovoltaic new energy power gray image, and $\|\ \|$ denotes calculation of the number of bits;

wherein, in S333, a method for combining gray values in the photovoltaic new energy power gray image and the image value to obtain new gray values is:

$GRAYimge'_2(x,y)=GRAYimge_2(x,y) \oplus IMAGE_2$, where, $GRAYimge'_2(x,y)$ denotes the new gray values; $GRAYimge_2(x,y)$ denotes a binary value of the gray value at the coordinates (x,y) of the photovoltaic new energy power image, x=1, 2, 3, ..., X, y=1, 2, 3, ..., Y, X denotes the number of horizontal pixels of the photovoltaic new energy power image, and Y denotes the number of vertical pixels of the photovoltaic new energy power image;

$\oplus$ denotes a binary operator;

$IMAGE_2$ denotes the binary image value;

wherein, S334 comprises the following steps:

S3341, forming the new photovoltaic new energy power image by all the new gray values; and S3342, taking the image value as a name of the new photovoltaic new energy power image;

S4, transmitting the processed photovoltaic new energy power image data to a photovoltaic new energy power management platform; and S5, transmitting, by the photovoltaic new energy power management platform, the processed photovoltaic new energy power image data to a blockchain for storage.

2. The blockchain-based new energy power data transmission method for a photovoltaic module according to claim 1, wherein S5 further comprises: after the photovoltaic new energy power management platform receives the new photovoltaic new energy power image, obtaining a photovoltaic new energy power platform image by means of the new photovoltaic new energy power image; and obtaining photovoltaic new energy power data according to the photovoltaic new energy power platform image.

3. The blockchain-based new energy power data transmission method for a photovoltaic module according to claim 2, wherein in S5, a method for obtaining a photovoltaic new energy power platform image by means of the new photovoltaic new energy power image comprises the following steps:

S51, acquiring the name of the new photovoltaic new energy power image; and

S52, generating the photovoltaic new energy power platform image by means of the new photovoltaic new energy power image and the name of the new photovoltaic new energy power image.

4. The blockchain-based new energy power data transmission method for a photovoltaic module according to claim 3, wherein in S52, a method for generating the photovoltaic new energy power platform image by means of the new photovoltaic new energy power image and the name of the new photovoltaic new energy power image comprises the following steps:

S521, acquiring the number of bits of the new photovoltaic new energy power image;

S522, obtaining the number of bits of a new platform image value according to the number of bits of the new photovoltaic new energy power image acquired in S521 and the name, which is a platform image value, acquired in S51;

S523, combining gray values in the new photovoltaic new energy power image and the new platform image value to obtain new platform gray values; and S524, obtaining the photovoltaic new energy power platform image according to the new platform gray values.

5. The blockchain-based new energy power data transmission method for a photovoltaic module according to claim 4, wherein in S522, a method for obtaining the number of bits of a new platform image value according to the number of bits of the new photovoltaic new energy power image acquired in S521 and the name, which is a platform image value, acquired in S51 comprises the following steps:

S5221, converting the platform image value in S522 into a binary platform image value which is denoted by $IMAGE'_2$, wherein $IMAGE'_2$ denotes the binary platform image value; and S5322, determining a relationship between $\|IMAGE'_2\|$ and $\|GRAYimge''\|$:

if $\|IMAGE'_2\|=\|GRAYimge''\|$ performing no operation on the binary platform image value, wherein $\|IMAGE'_2\|$ denotes the number of bits of the binary platform image value, $\|GRAYimge''\|$ denotes the number of bits of the new photovoltaic new energy power image received by the photovoltaic new energy power management platform, and $\|\ \|$ denotes calculation of the number of bits;

if $\|IMAGE'_2\|>\|GRAYimge''\|$, keeping first $\|GRAYimge\|$ bit of the binary platform image value, wherein $\|IMAGE'_2\|$ denotes the number of bits of the binary platform image value, $\|GRAYimge''\|$ denotes the number of bits of the new photovoltaic new energy power image received by the photovoltaic new energy power management platform, and $\|\ \|$ denotes calculation of the number of bits; or if $\|IMAGE'_2\|>\|GRAYimge''\|$ adding $\|IMAGE'_2\|-\|GRAYimge''\|$ 0 or 1 in front of or behind the binary platform image value, wherein $\|IMAGE'_2\|$ denotes the number of bits of the binary platform image value, $\|GRAYimge''\|$ denotes the number of bits of the new photovoltaic new energy power image received by the photovoltaic new energy power management platform, and $\|\ \|$ denotes calculation of the number of bits.

6. The blockchain-based new energy power data transmission method for a photovoltaic module according to claim 4, wherein in S523, the gray values in the new photovoltaic new energy power image and the new platform image value are combined to obtain the new platform gray values:

$GRAYimge'''_2(x,y) = GRAYimge''_2(x,y) \oplus IMAGE'_2$, where, $GRAYimge'''_2(x,y)$ denotes the new platform gray values;

$GRAYimge''_2(x,y)$ denotes a binary value of the gray value at coordinates (x,y) of the new photovoltaic new energy power image received by the photovoltaic new energy power management platform, x=1, 2, 3, ..., X, y=1, 2, 3, ..., Y, X denotes the number of horizontal pixels of the new photovoltaic new energy power image, and Y denotes the number of vertical pixels of the new photovoltaic new energy power image;

$\oplus$ denotes a binary operator;

$IMAGE'_2$ denotes the binary platform image value.

\* \* \* \* \*